Patented June 17, 1952

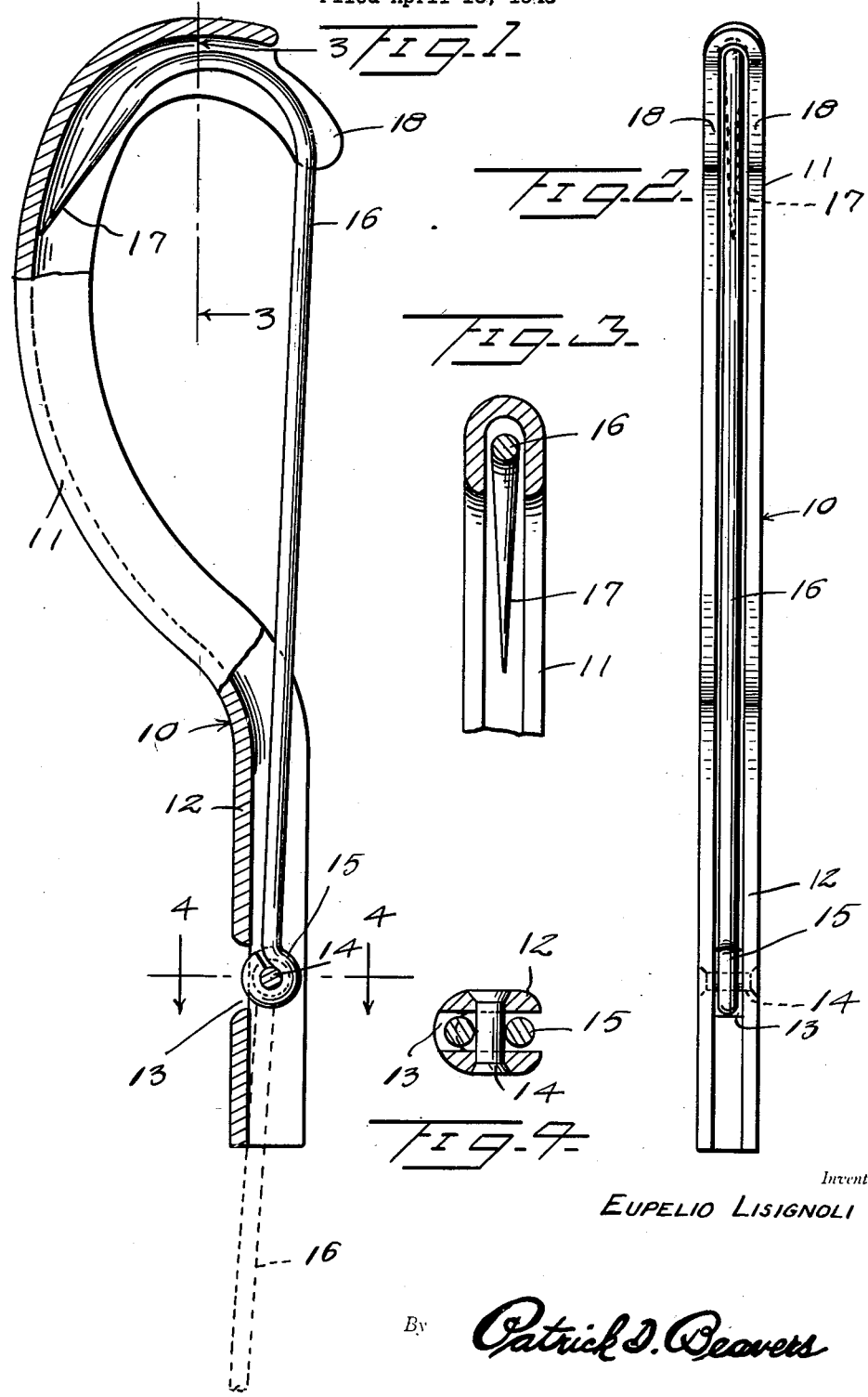

2,600,510

UNITED STATES PATENT OFFICE 2,600,510

FOLDING GAFF HOOK

Eupelio Lisignoli, Cloverdale, Calif.

Application April 16, 1948, Serial No. 21,468

1 Claim. (Cl. 294—26)

The present invention relates to folding gaff hooks and it consists in the combinations, constructions and arrangements of parts herein described and claimed.

It is an object of the present invention to provide a gaff hook which is adapted to be folded when not in use and which, when so folded, will take up a minimum of space.

Another object of the invention is the provision of a folding gaff hook which is composed of a minimum number of parts, which is simple in its construction and operation and yet effective and efficient in use.

A further object of the invention is the provision of a gaff hook in which the sheath for storing the hook in its folded condition acts as a handle for the same when unfolded for use.

Other and further objects of the invention will become apparent from a reading of the following specification taken in conjunction with the drawing, in which:

Figure 1 is an elevational view, partly broken away, of an embodiment of the invention, Figure 2 is a side elevational view thereof, Figure 3 is a sectional view taken along line 3—3 of Figure 1, and Figure 4 is a sectional view taken along line 4—4 of Figure 1.

Generally there is provided a gaff hook particularly adapted for use with medium sized fish and which may be safely carried in folded condition in the pocket of the user or in his tackle box. It consists of a handle portion of generally U-shaped construction throughout its length and so curved as to accept therein the hook portion thereof to sheath the same when the device is in folded condition. The hook is provided with a shank which is pivotally connected adjacent the lower end of the handle. The device has but three parts: the handle, the hook and a rivet interconnecting the same.

Referring more particularly to the drawing, there is shown therein a handle, generally indicated at 10 and comprising a curved hand grip portion 11 and a straight shank 12. The handle is of U-shaped cross sectional area throughout its length. The shank 12 is provided with an opening 13 adjacent which is affixed a transversely extending rivet 14 upon which is pivotally mounted an eye 15 of an elongated hook 16 having pointed end 17.

The hand grip portion is provided with a pair of outwardly extending guide ears 18.

In use, it will be seen that the hook may be rotated to a folded position such as is shown particularly in Figure 1 of the drawing and that the ears 18 serve to guide the point 17 of the hook between the sides of the handle to sheath the same therein. The opening 13 serves to allow free rotation of the eye 15. When it is desired to use the gaff, the hook may be rotated outwardly of the handle until the same bears against the inner wall of the shank 12 which serves as a brace therefor whereupon the same may be used as a conventional gaff. The handle may be made of a relatively soft steel, a plastic material, aluminium or one of the light alloy metals of which aircraft is now generally constructed. The hook is preferably formed of spring or carbon steel.

While but one form of the invention has been shown and described herein, it will be readily apparent to those skilled in the art that many minor modifications may be made without departing from the spirit of the invention or the scope of the appended claim.

What is claimed is:

A device of the character described comprising a handle of U-shaped cross sectional area having a hand grip portion, an integrally formed shank portion having an opening adjacent its free end and a pair of outwardly extending spaced parallel guide ears integrally formed with the hand grip portion, a rivet transversely mounted in the shank adjacent the opening therein, and a hook having an eye pivotally mounted on said rivet, said eye extending partially into said opening, and said hook being receivable point foremost between said guide ears and in said hand grip portion when in folded condition.

EUPELIO LISIGNOLI.

REFERENCES CITED

The following references are of record in the file of this patent:

UNITED STATES PATENTS

| Number | Name | Date |
|---|---|---|
| 274,570 | Davis | Mar. 27, 1883 |
| 827,246 | Livingston | July 31, 1906 |
| 1,640,102 | Valliere | Aug. 23, 1927 |
| 1,738,844 | Roberts | Dec. 10, 1929 |
| 2,372,743 | Schofield | Apr. 3, 1945 |
| 2,461,941 | Sutton | Feb. 15, 1949 |